United States Patent
Green et al.

(10) Patent No.: US 8,803,844 B1
(45) Date of Patent: Aug. 12, 2014

(54) CAPACITIVE FINGER PUPPET FOR USE ON TOUCHSCREEN DEVICES

(71) Applicant: DigiPuppets LLC, Philadelphia, PA (US)

(72) Inventors: Brendan Green, Philadelphia, PA (US); Daniel Clay, Philadelphia, PA (US); Daphne Car, Philadelphia, PA (US)

( * ) Notice: Subject to any disclaimer, the term of this patent is extended or adjusted under 35 U.S.C. 154(b) by 0 days.

(21) Appl. No.: 14/143,056

(22) Filed: Dec. 30, 2013

Related U.S. Application Data

(60) Provisional application No. 61/885,800, filed on Oct. 2, 2013.

(51) Int. Cl.
| G06F 3/045 | (2006.01) |
| G06F 3/041 | (2006.01) |
| G06F 3/044 | (2006.01) |
| G06F 3/0354 | (2013.01) |

(52) U.S. Cl.
CPC .......... *G06F 3/03545* (2013.01); *G06F 3/0416* (2013.01); *G06F 3/044* (2013.01)
USPC ........................................................ 345/174

(58) Field of Classification Search
CPC ... G06F 3/014; G06F 3/03545; G06F 3/0219; G06F 3/0234; G06F 3/0238; G06F 3/033; G06F 2203/0331
USPC ........... 345/156–184; 341/20–22; 340/20–22; 361/680; 400/489
See application file for complete search history.

(56) References Cited

U.S. PATENT DOCUMENTS

| 3,239,961 | A | * | 3/1966 | Forkner .................. 446/130 |
| 3,534,495 | A | * | 10/1970 | Goldman .............. 446/185 |
| D298,263 | S | * | 10/1988 | Perry et al. .............. D19/42 |
| 5,931,450 | A | * | 8/1999 | Yoder ..................... 256/66 |
| 6,127,949 | A | * | 10/2000 | Dodd ..................... 341/22 |
| 8,277,222 | B2 | | 10/2012 | Shepherd |
| 2003/0016210 | A1 | * | 1/2003 | Soto et al. ............... 345/173 |
| 2008/0030290 | A1 | * | 2/2008 | Norman ................. 335/296 |
| 2010/0271339 | A1 | * | 10/2010 | Helm ..................... 345/179 |
| 2011/0069019 | A1 | * | 3/2011 | Carpendale et al. ...... 345/173 |

(Continued)

FOREIGN PATENT DOCUMENTS

| CA | 2752803 A1 | 3/2013 |
| EP | 2470034 A1 | 7/2012 |
| WO | 2012077894 A1 | 6/2012 |
| WO | 2013049185 A2 | 4/2013 |

*Primary Examiner* — Prabodh M Dharia
(74) *Attorney, Agent, or Firm* — J. Eric Sumner

(57) ABSTRACT

An apparatus and method for operating a touchscreen device using a device having a rigid or semi-rigid body composed of an exterior side and a hollow interior side. The interior side is sized to receive and substantially surround at least a portion of a finger of a user. One or more contact points are provided on the exterior side of the body element, wherein each contact point when placed into contact with a touchscreen device provides an electrical charge to the touchscreen device making it able to manipulate at least one element on the touchscreen. In certain non-limiting aspects, the device takes the form of a shape, design, animal, humanoid, non-humanoid, object, character, or the like with the contact points being one or more aspects of or protrusions from the device.

27 Claims, 13 Drawing Sheets

(56) References Cited

U.S. PATENT DOCUMENTS

| | | | |
|---|---|---|---|
| 2012/0188182 A1* | 7/2012 | McKenna | 345/173 |
| 2012/0223909 A1* | 9/2012 | Tse et al. | 345/174 |
| 2012/0242618 A1 | 9/2012 | Everest et al. | |
| 2013/0076690 A1 | 3/2013 | Vellanki | |
| 2013/0100075 A1* | 4/2013 | Viswanathan et al. | 345/175 |
| 2013/0104278 A1 | 5/2013 | Christopherson et al. | |
| 2013/0127791 A1 | 5/2013 | Siuta | |
| 2013/0192013 A1 | 8/2013 | Clausen | |
| 2013/0236669 A1 | 9/2013 | Jiang et al. | |
| 2013/0268094 A1 | 10/2013 | Van Wiemeersch | |

* cited by examiner

CAPACITIVE FINGER PUPPET FOR USE ON TOUCHSCREEN DEVICES

CROSS REFERENCE TO RELATED APPLICATIONS

The present application claims priority to U.S. Provisional Application Ser. No. 61/885,800, filed on Oct. 2, 2013, the contents of which are incorporated herein by reference in its entirety.

FIELD OF THE INVENTION

The invention relates, in part, to touchscreen displays and more particularly to devices, and the associated methods, for activating/operating touchscreen displays.

BACKGROUND

Over the past few decades, the amount and variety of touchscreen devices has dramatically expanded. Of the huge variety of products, tablets and smartphones have emerged as the most influential as they have become key tools for work and play. Almost all tablets and smartphones on the market today use capacitive touchscreen technology as opposed to resistive touchscreen technology. A capacitive touchscreen panel typically includes an insulator such as glass, coated with a transparent conductor such as indium tin oxide (ITO). As the human body is also an electrical conductor, touching the surface of the screen results in a distortion of the screen's electrostatic field, measurable as a change in capacitance. Different technologies may be used to determine the location of the touch. The location is then sent to the controller for processing.

While capacitive touchscreens work well in general, some people find the devices unhygienic to operate. Previous tests of mobile phones found high numbers of disease causing bacterial and viral particles, including, for example, fecal coliforms, *Staphylococcus aureus*, enterobacteria, such as *Escherichia coli* and *Salmonella enterica*, the flu virus, and the like. This is of particular concern to parents who see their children using capacitive touchscreen devices increasingly often in their daily lives. Touchscreen devices are often used by many different individuals in many different settings, allowing for the accumulation of such surface borne bacteria and other possibly harmful microbes. Also, under ordinary use with bare hands, a user's skin oil may leave unsightly smudges on the capacitive touchscreen, requiring frequent cleaning. Accordingly, a need exists for better tools for children and those concerned with hygiene to operate a touchscreen device while keeping both themselves and the device clean.

While most people find capacitive touchscreens easy to operate with only their fingers, some individuals also find the devices difficult to operate due to the high level of precision needed to perform some operations. For example, users with large fingers might find typing to be difficult as their fingers hit more than one letter at a time. Similarly, young children often use more than one finger or the whole hand when trying to operate touchscreen devices, resulting in accidental selections, operation problems or malfunction. A very clear contact point for touching the screen could help users who attempt operating touchscreens with multiple fingers or for those whose whole hand rests on the screen and obstructs functionality. Accordingly, a need also exists for better tools that allow users who have difficulty using their fingers to operate touchscreen devices or for a tool that allows for more precise and accurate manipulation of a touchscreen device that can help develop or improve the user's dexterity.

Touchscreen styli have also become very common with the advent of tablets and smartphones. In computing, a stylus (or stylus pen) is a small pen-shaped instrument that is used to input commands to a computer screen, mobile device or graphics tablet. With touchscreen devices, a user places a stylus on the surface of the screen to draw or make selections by tapping the stylus on the screen. Previous styli made for use with resistive touchscreen devices were primarily simple wooden or plastic pen-type stylus with a non-marking tip. However, with the change in touchscreen technology from resistive to capacitive, the technology behind the styli has changed. Current styli primarily have metal bodies and tips made from a variety of materials, such as rubber or foam that are either conductive or electrostatically dissipative. However, the problem remains that styli are primarily functional and intended to be used like the writing utensils that they resemble. Furthermore, aggressive use with metallic or hard styli may result in damage, such as scratches or cracks, to a touchscreen device screen. This damage may occur from uses by adults or by children. As such, a need also exists for a functional and protective manipulation accessory that users will want to use and/or will find enjoyable to use, while allowing for precise movement and protecting the screen.

The present invention addresses at least the foregoing needs.

SUMMARY

The invention relates, in part, to capacitive touchscreen displays and more particularly to devices, and the associated methods, for activating/operating capacitive touchscreens. In certain non-limiting aspects, the present invention includes an apparatus for operating a touchscreen device that includes (1) a rigid or semi-rigid body, as defined herein, having an exterior side and a hollow interior side that is sized to receive and substantially surround at least a portion of a finger of a user; and (2) one or more contact points on the exterior side of the body element, wherein each contact point when placed into contact with a touchscreen device provides and/or channels an electrical charge to the touchscreen device.

In certain non-limiting embodiments, the rigid or semi-rigid body includes a non-conductive resin and at least one electrically conductive additive. In such embodiments, the contact point(s) may include any portion of at least the exterior side of the body, such that when the body receives and contacts the finger of the user an electrical charge is transferred and/or channeled from the finger to the contact point(s) through the device's body. The non-conductive resin may be selected from the group consisting of TPE, urethane, polyurethane, silicone, polyethylene, polypropylene, PET, PVC, TP, TPV, TPU and combinations thereof. The electrically conductive additive may include one or more of copper, gold, silver, aluminum, steel, metal alloy, metal coatings, metal wire, metallic threads, metallic powders, conductive tape, conductive paint, conductive foam, carbon black, carbon fiber, stainless steel fiber, nickel coated carbon, silver coated carbon, graphite powder, and combinations thereof.

The conductive additive may be provided in any amount to render the body electrically conductive. In certain non-limiting aspects, it is provided in an amount from about 10 wt. % to about 30 wt. %, based on the total weight of the materials used in the body. In certain preferred, but non-limiting embodiments, the body element includes TPE as the non-conductive resin and carbon black as the conductive additive. In alternative, but non-limiting embodiments, the body element includes silicone (and/or any of the other non-conductive materials provided herein) as the non-conductive resin and carbon black (and/or any of the other conductive additives provided herein) as the conductive additive.

In further non-limiting embodiments, the body element also includes at least one electrically conductive insert material that is in electrical communication with the one or more contact points. The insert material is coupled to a portion of the interior side of the body element such that, when the body receives the finger of the user, contact with the insert material transfers and/or channels electrical charge from the finger to the insert material, and ultimately the contact point(s). In such embodiments, the body may comprise a non-conductive resin and the insert material may comprise a non-conductive resin with an electrically conductive additive. Again, non-conductive resins for either the body or the insert material may be selected from the group consisting of TPE, urethane, polyurethane, silicone, polyethylene, polypropylene, PET, PVC, TP, TPV, TPU and combinations thereof. Electrically conductive additives may include one or more of copper, gold, silver, aluminum, steel, metal alloy, metal coatings, metal wire, metallic threads, metallic powders, conductive tape, conductive paint, conductive foam, carbon black, carbon fiber, stainless steel fiber, nickel coated carbon, silver coated carbon, graphite powder, and combinations thereof.

The conductive additive may be provided in the insert in any amount to render the insert electrically conductive. In certain non-limiting aspects, it is provided in an amount from about 10 wt. % to about 30 wt. %, based on the total weight of the materials used in the insert. In certain preferred, but non-limiting embodiments, the insert element includes TPE as the non-conductive resin and carbon black as the conductive additive.

The insert material may be electrically coupled to the contact point(s) by any method discussed herein or otherwise known in the art. In certain aspects, it is connected by an electrically conducting path, which may include one or more of the following materials: copper; gold; silver; aluminum; steel; a conductive metal; a conductive metal alloy; carbon black; carbon fiber; a metal coating; conductive tape; and combinations thereof. In further embodiments, the electrically conducting path includes a non-conductive resin, examples of which are provided above, along with an electrically conductive additive, as also provided above.

The device of the present invention may be in any shape, design, form, configuration, or the like to accomplish the advantages provided herein or otherwise consistent with the uses described herein. In certain non-limiting aspects, it is manufactured to form an animal, a shape, a design, a figurine, a character (fictitious or otherwise), a humanoid, a non-humanoid, or the like. In such embodiments, the contact point(s) include one or more aspects or protrusions of the device, including, for example, a nose, an arm, an ear, an extremity, extension, horn, or the like. In other embodiments, the contact point(s) may include any surface on the exterior side of the body.

The device also may be equipped or coupled to a communication element (such as one or more of a chip, RFID, bar code, QR code, sound emitting element, or the like) that communicates to a touchscreen device specific features or characteristics about the body. By way of non-limiting example, the touchscreen device may be equipped with an operating system or software application that is preprogrammed to associate certain body types with the communication element. If the body is an animal, shape, or humanoid, for example, the communication element would provide a signal to the touchscreen device that the device would recognize and associate with the particular body type. This can be used for an interactive experience with the operating system or software application, as discussed in greater detail below.

In further embodiments, the body of the device includes or is coupled to at least one electricity generating device that imparts an electrical charge to one or more of the contact points. In such embodiments, the body may be comprised from a non-conductive resin and optionally at least one electrically conductive additive and may optionally include the conductive insert material. The electricity generating device may be provided at or near and in electrical communication with the contact points. To this end, the contact points may contain an electrical charge independent of a user's finger, by way of the electricity generating device.

In operation, a conductive touchscreen device can be manipulated by a user first inserting his or her finger into the hollow interior side of the rigid body. The user then contacts the surface of the touchscreen device such that the electrical charge from the one or more contact points is received by the touchscreen. By contacting the screen, the user can then manipulate one or more elements on the touchscreen using the device.

In certain aspects, such a device is more hygienic and safe for use and allows for more precise and non-damaging manipulation of the touchscreen device. The device is particularly advantageous for children in that it can be used as a learning tool with attractive and interactive characters physically interacting with a digital interface. By combining the body with character-focused games, children can stay engrossed in a learning activity, while also improving dexterity. The device of the present invention may alternatively be used to assist those who have difficulty with the precision use of touchscreen devices, because of the smaller keys, larger hands, or poor motor skills. To this end, the device can be a substitute for using one's finger or may be provided as a learning tool.

Additional embodiments, modification and advantages of the present invention will be readily appreciated by one of skill in the art on the basis of the disclosure provided.

DETAILED DESCRIPTION

Figure 1:
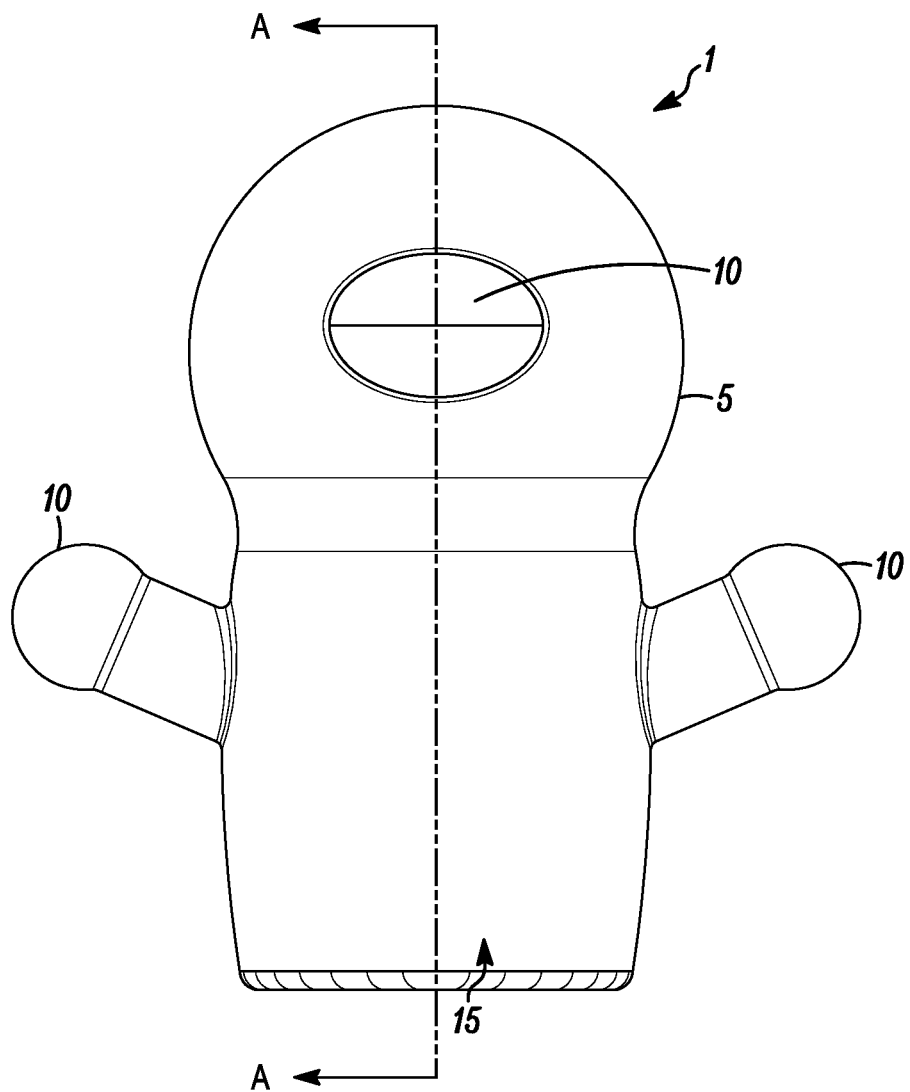
FIG. 1 illustrates a front-side view of one embodiment of the device of the present invention.

The invention relates, in part, to capacitive touchscreen displays and more particularly to devices, and the associated methods, for activating/operating capacitive touchscreen displays. In certain non-limiting aspects, the present invention includes an apparatus for operating a touchscreen device that includes (1) a rigid or semi-rigid body that is sized to receive and substantially surround a portion of a finger of a user; and (2) one or more electrically charged contact points on the exterior surface of the body element, which are recognized by the touchscreen device and may be used to manipulate one or more elements present on the touchscreen display.

In certain non-limiting embodiments, the contact point is charged through a conductive additive within the body and/or a conductive insert coupled to the interior cavity of the body. Such an additive or insert creates an electrical pathway from the user's finger to the contact point. Thus, the contact point may be charged from the capacitive charge of the person's finger. In other embodiments, the electrical charge of the contact point is artificially created using an electricity producing device (such as a chip) imbedded within or otherwise attached to the body, preferably, though not exclusively, at or near the contact point(s) or otherwise in electrical communication with the contact point(s). The charge is conducted from the electricity producing device to the contact point(s) by way of the electrical pathway so that the device can operate or otherwise manipulate one or more elements on the touchscreen device.

The device may be used to interact with a capacitive touchscreen by way of the contact point(s) engaging the capacitive touchscreen. In one embodiment, the finger of the user to which the device is attached may be positioned relative to the capacitive touchscreen when using the device in a manner similar to the position of a finger manipulating the capacitive touch panel without use of the device (e.g., substantially parallel to the capacitive touchscreen). When the contact point is touched to a capacitive touchscreen, it causes a distortion in the device's electrostatic field that is recognized by the touchscreen device and allows for user manipulation of the area. The present device and method maintains a barrier between the user and the touchscreen that prevents the transfer of bacteria and other microbes between the user and the touchscreen device. Thus, touchscreen manipulation is more hygienic and safe for a child and allows for more precise and non-damaging manipulation of the touchscreen device while improving dexterity. The body and contact point is rigid or semi-rigid (as defined herein) and relatively finite, again, allowing for more precise, reliable, and non-damaging manipulation of the touchscreen device while improving dexterity.

As discussed in greater detail below, the contact point(s), in certain preferred embodiments, may be configured to extend as a protuberance away from the axis of the finger, either longitudinal or laterally, when the device is mounted to the finger. By way of non-limiting example, when the device is provided as character, figurine, shape, design or the like, as discussed in greater detail below, the contact point may include one or more anatomical or non-anatomical protrusions extending away from the body. Examples include, but are not limited to, the head, horns, nose, ears, appendages, hands or any extension from the body of the device. The present invention, however, is not limited to such embodiments and any portion of the body may be a contact point, particularly, though not exclusively, when the body material includes an electrically conductive additive.

A number of feature refinements and additional features are applicable to the aspects presented herein. These feature refinements and additional features may be used individually or in any combination. As such, each of the following features that will be discussed may be, but are not required to be, used with any other feature or combination of features of the aspects presented herein.

Figure 2:
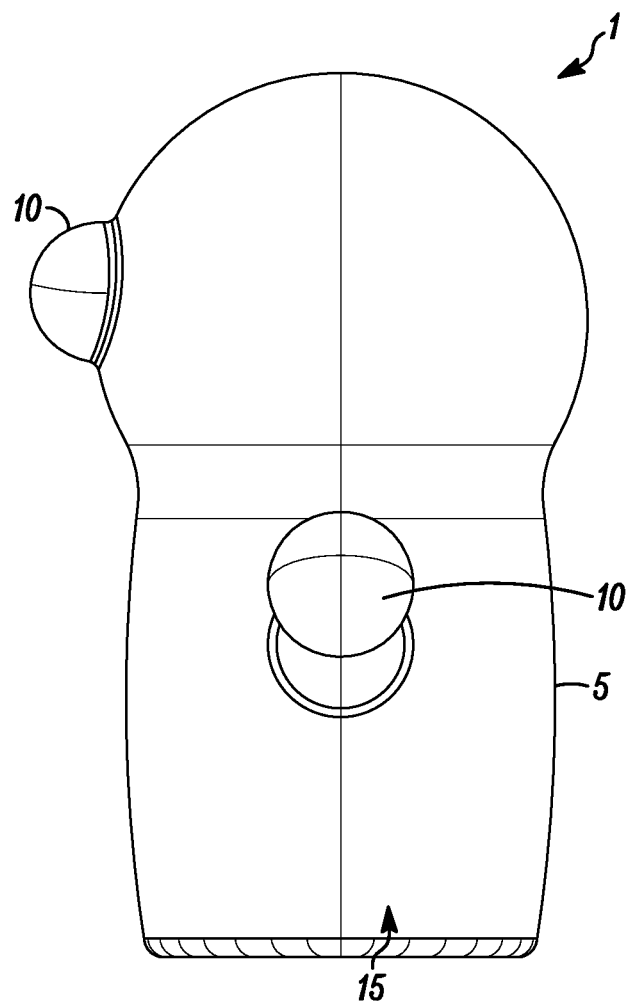
FIG. 2 illustrates a side view of the same embodiment of FIG. 1.
Figure 3:
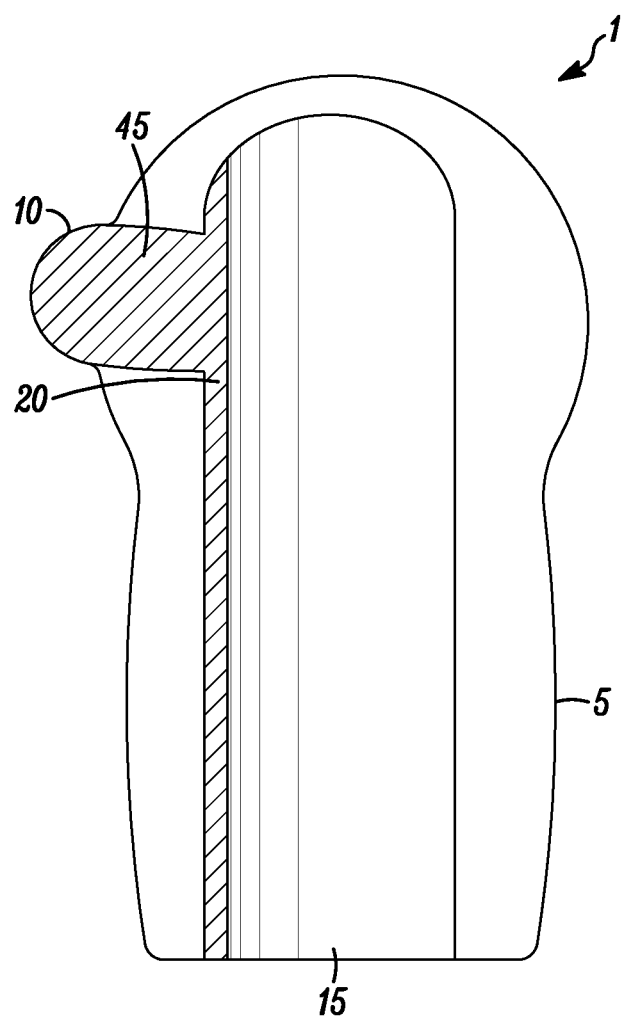
FIG. 3 illustrates a cut-away view along line A-A of FIG. 1 and provides one embodiment of the present invention.
Figure 4:
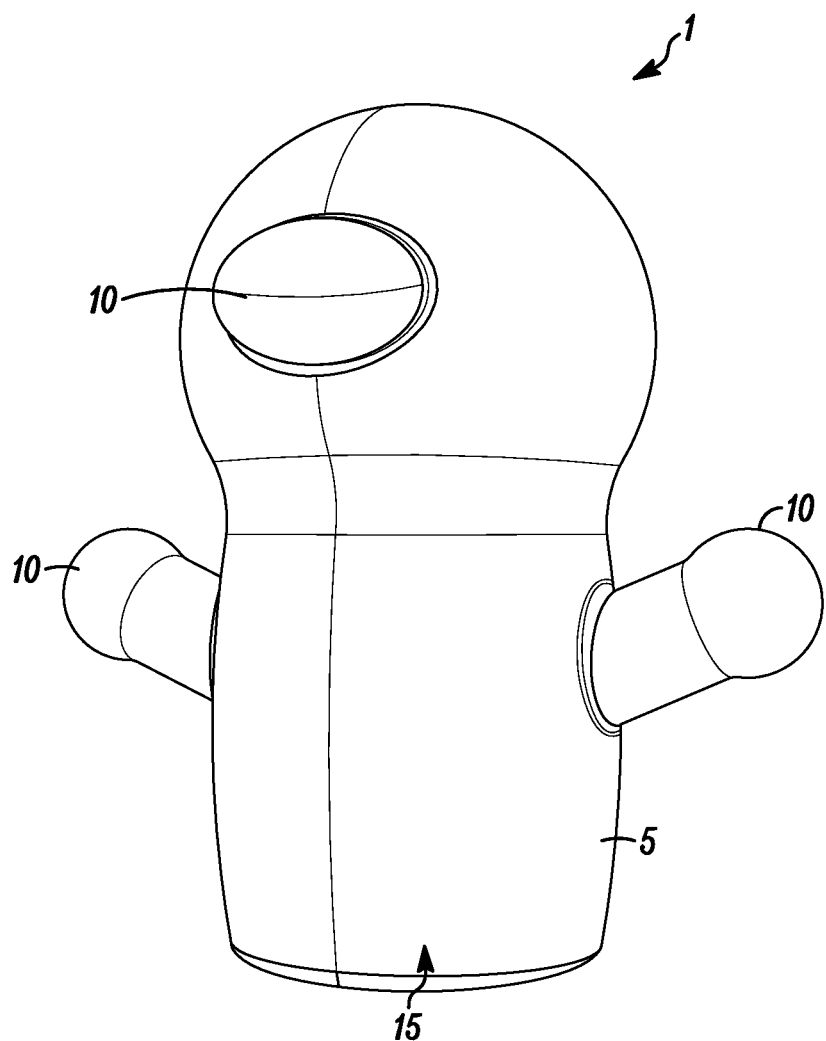
FIG. 4 illustrates an angled profile view of one embodiments of the device of the present invention demonstrating multiple contact points.
Figure 5:
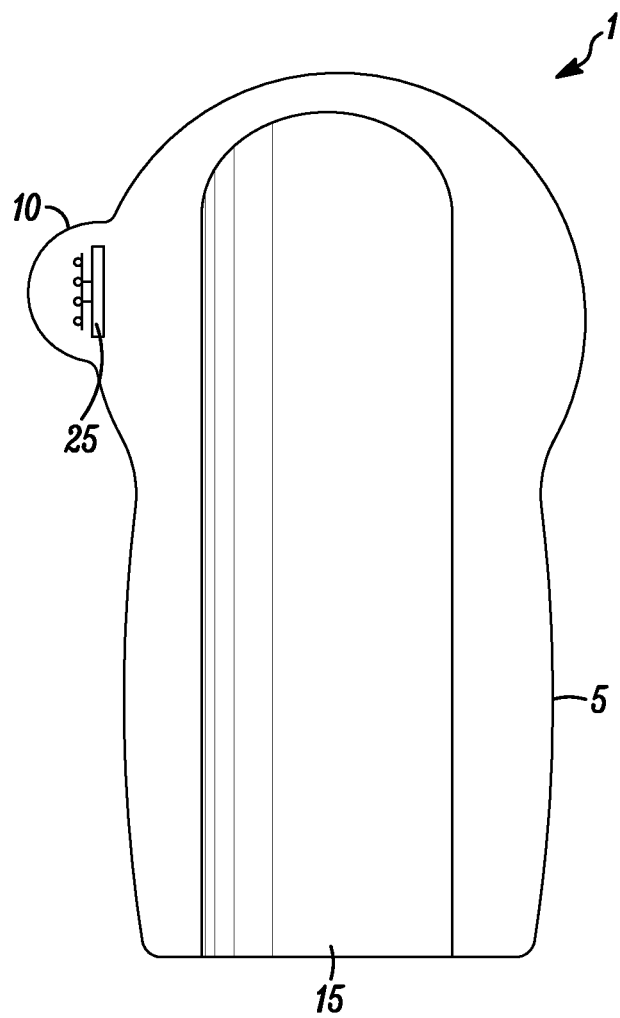
FIG. 5 illustrates a side-view of an alternative embodiment of the present invention having an electricity generating device.
Figure 6:
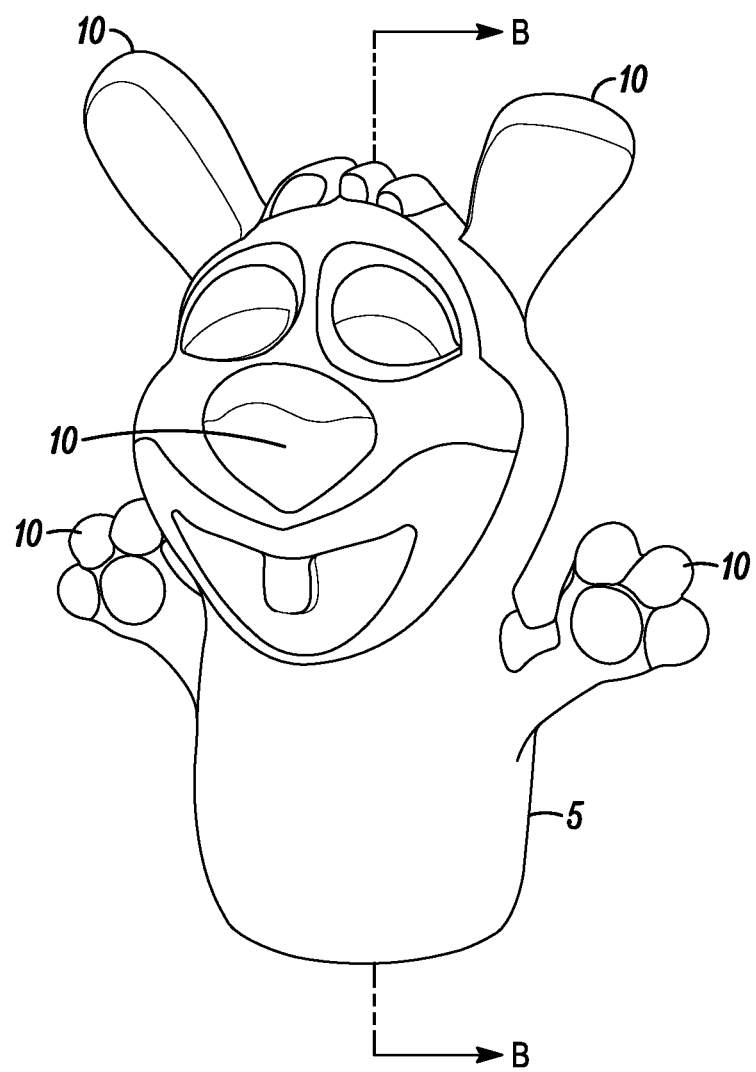
FIG. 6 illustrates one embodiment of the invention where the device is shaped like an animal, in this instance a rabbit.

Referring to FIGS. 1-11, numerous non-limiting embodiments of a device 1 in accordance with the present invention are depicted. FIGS. 1-3 provide an overview of one embodiment of the body 5 having at least one contact point 10, and a cavity 15 for receiving the finger of a user. FIG. 4 illustrates an embodiment of the device 1 with multiple contact points 10. FIG. 5 illustrates an embodiment of the device having an electricity generating element 25. FIGS. 6-9 and 11 illustrate an embodiment of the invention where the device 1 is shaped like an animal, in this non-limiting instance a rabbit. FIGS. 10A-10C illustrate one embodiment of the use of the device 1.

With reference to FIGS. 1-4 and 6, the device 1 includes an external shell or body 5. The device is illustrated as having one or more contact points 10 that protrude longitudinally, laterally, or at any angle from the longitudinal axis of the body 5, though the present invention is not limited to such protrusions as contact points, as discussed herein. Contact points 10, as discussed in greater detail below, contain an electrical charge such that, when placed into contact with a capacitive touchscreen device, such as that illustrated in FIGS. 10A-C, create a disturbance in the device's electrostatic field resulting in the precise, fun, protective and/or hygienic manipulation of the touchscreen device.

The body 5 is designed to make the device 1 comfortable and safe for the user, particularly children (e.g. no hard corners or edges), but it may also protect the touchscreen device from aggressive usage. To this end, it may be designed using a structure and materials that can dampen the force or pressure being exerted on the screen of the device, preventing possible screen cracks or damage. It may also prevent scratches to the screen of the touchscreen device from aggressive use. The interior cavity 15 of body 5 creates a space for the finger 30 that is designed to be both comfortable for extended usage as well as able to securely accommodate a wide variety of finger shapes and sizes.

While the body may include any of the materials discussed herein, in certain aspects it is rigid or semi-rigid in the sense that it substantially maintains its structure when contacting the surface of the touchscreen such that it provides a reliable and predictable contact location. The material of the body, particularly in the cavity 15 should also be soft and comfortable to the user while shielding the user's finger from the hard surface of the touchscreen device and allowing for extended usage.

In certain aspects, and as used herein, the rigidity and semi-rigidity of the body is defined by its hardness, according to a durometer. In certain aspects, a rigid or semi-rigid body has a hardness of between about 10 to about 60 shore A; in certain preferred embodiments between about 20 and about 50 shore A; and in certain preferred embodiments between about 25 and about 40 shore A. Again, such hardness is sufficient to provide a reliable contact point for the touchscreen, but sufficient flexibility to be comfortable to the user and not damage the device.

The cavity 15 may be in any shape or size to accomplish the objectives, advantages, and/or methods discussed herein. In certain aspects it is substantially cylindrical to fit any finger 30 size and may be tapered at the end of the cavity distal to the opening. In further aspects, users with small fingers, such as, but not limited to children, will be able to insert their finger almost entirely into the device, but the enclosed nature of the insert will ensure that it does not go too far so as to impede usage. Users with larger fingers will not be able to insert their fingers as far, but the body should be elastic-enough to ensure that the device fits tightly to the finger, while simultaneously (and substantially) maintained the shape of the device. This, again, allows for precise use of the device with a touchscreen device.

In certain non-limiting embodiments the body 5 is manufactured from a non-conductive resin material. Non-limiting examples of such materials include one or more of thermoplastic elastomers (TPE), urethane, polyurethane, silicone, polyethylene, polypropylene, polyethylene terephthalate (PET), polyvinyl chloride (PVC), terephthalate (TP), thermoplastic vulcanizate (TPV), thermoplastic polyurethane (TPU), and derivatives thereof or similar materials. The present invention is not limited to such materials, however, and the body may be manufactured with any material suitable for the purposes provided herein, including, but not limited to, fabric, foam, rubber, plastic, metal, wood, paper, or the like, or any combination thereof. In certain embodiments, for example, a portion of the device 1 may include or be made of a fabric, foam, or of a soft material. The portion may be used to clean the screen of the touchscreen device before, during, or after use.

In certain embodiments, the electrical charge contained within the contact point(s) 10 of the body 5 is derived from the capacitive charge of the user's finger 30. This can be accomplished by including an electrically conductive additive within the body element or coupling the body to an electrically conductive insert. With the former, the body 5 is manufactured to include both the non-conductive resin (defined above) and at least one electrically conductive additive. Such additives may include any material capable of transferring or channeling electrical charge from one location to another. In certain aspects, the conductive additive may be a material that is electrically conductive and has been designed to be safe for use in a children's toy or is safe for use in conjunction with the other materials/methods provided herein. To achieve this, again, the base resin of the body 5 (or total composition of the body 5, including conductive and optionally non-conductive materials) may be approved for oral and skin contact and the additive used for conductivity may be concentrated sufficiently to create electrical resistance levels in the range of 10e2 to 10e5 ohms per square centimeter and also approved for oral and skin contact. Non-limiting examples of such additives may include one or more of copper, gold, silver, aluminum, steel, metal alloy, metal coatings, metal wire, metallic threads, metallic powders, conductive tape, conductive paint, conductive foam, carbon black, carbon fiber, stainless steel fiber, nickel coated carbon, silver coated carbon, graphite powder, and combinations thereof.

The conductive additive may be provided within the body 5 in any effective amount to render the body electrically conductive in accordance with the foregoing with a sufficient resistance level to be operable with a capacitive touchscreen device. In certain non-limiting aspects, such an effective amount is an amount from about 1 wt. % to about 90 wt. %; in further embodiments from about 5 wt. % to about 50 wt. %; and in further embodiments from about 10 wt. % to about 30 wt. %, based on the total weight of the materials used in the body. In certain preferred embodiments, the body element comprises, but is not limited to one or more of the following combinations: a carbon black powder bound or suspended in a thermoplastic elastomer (TPE) resin, a carbon black powder bound or suspended in a urethane resin, a carbon black powder bound or suspended in a silicone resin, stainless steel fiber bound or suspended in a TPE resin, stainless steel fiber bound or suspended in a urethane resin, stainless steel fiber bound or suspended in a silicone resin, silver and/or nickel coated carbon fibers bound or suspended in a TPE resin, silver and/or nickel coated carbon fibers bound or suspended in a urethane resin, silver and/or nickel coated carbon fibers bound or suspended in a silicone resin, graphite powder bound or suspended in a TPE resin, graphite powder bound or suspended in a urethane resin, graphite powder bound or suspended in a silicone resin, a combination of any of these additives bound or suspended in a TPE, urethane, or silicone resin.

Again, in such embodiments, the contact point(s) of the device may include any protrusion or extension from the body. But, because the body is manufactured from a conductive material, the contact point(s) also may include any point on the surface of the body.

Figure 7:
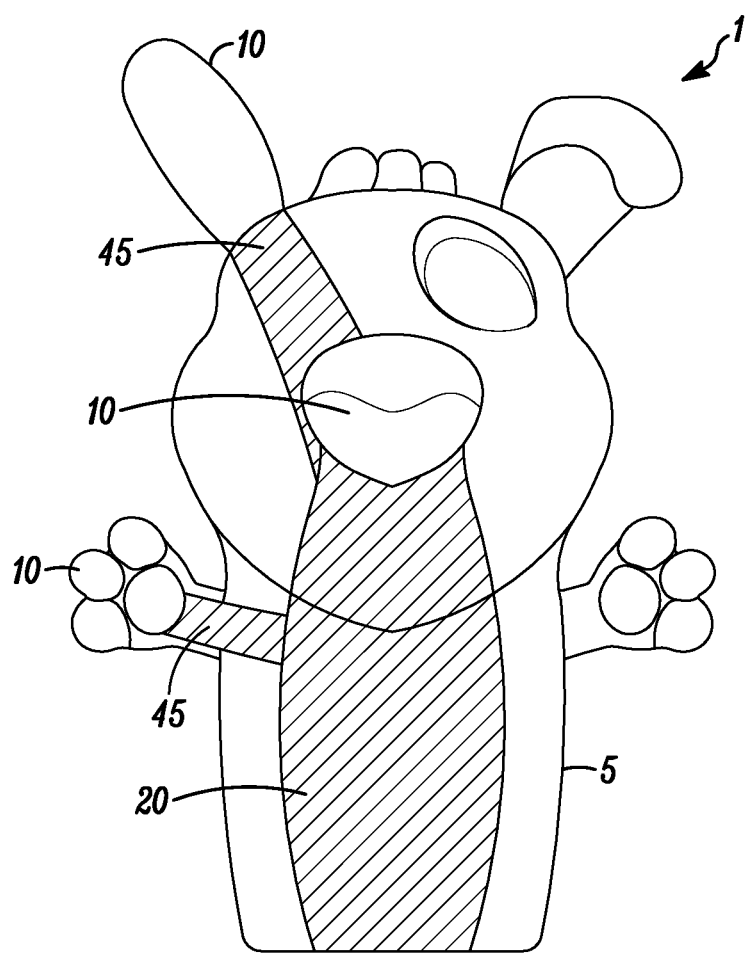
FIG. 7 illustrates the same embodiment of FIG. 6 having a conductive insert material.
Figure 8:
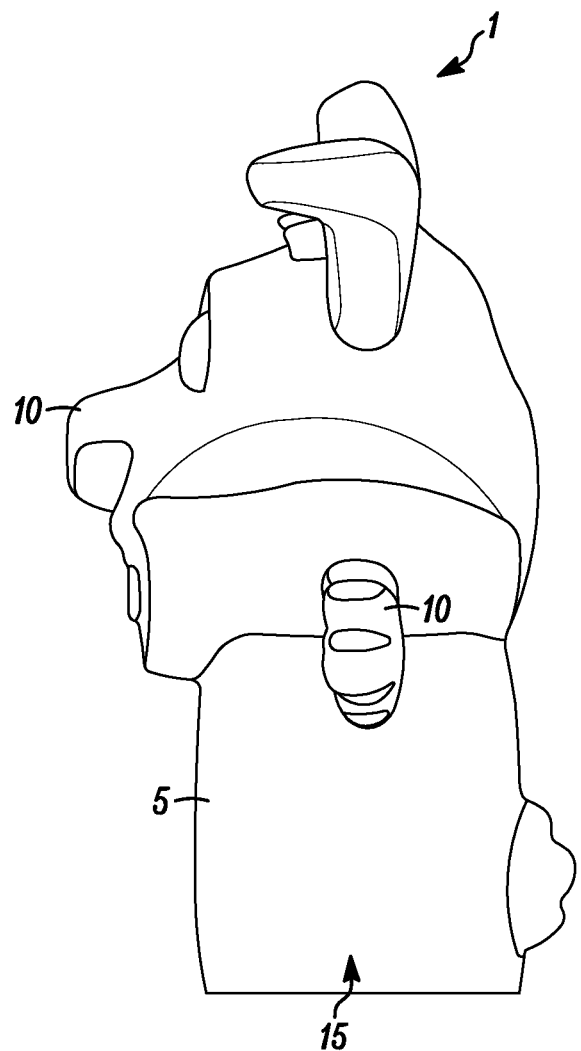
FIG. 8 illustrates a side-view embodiment of the embodiment in FIG. 6.
Figure 9:
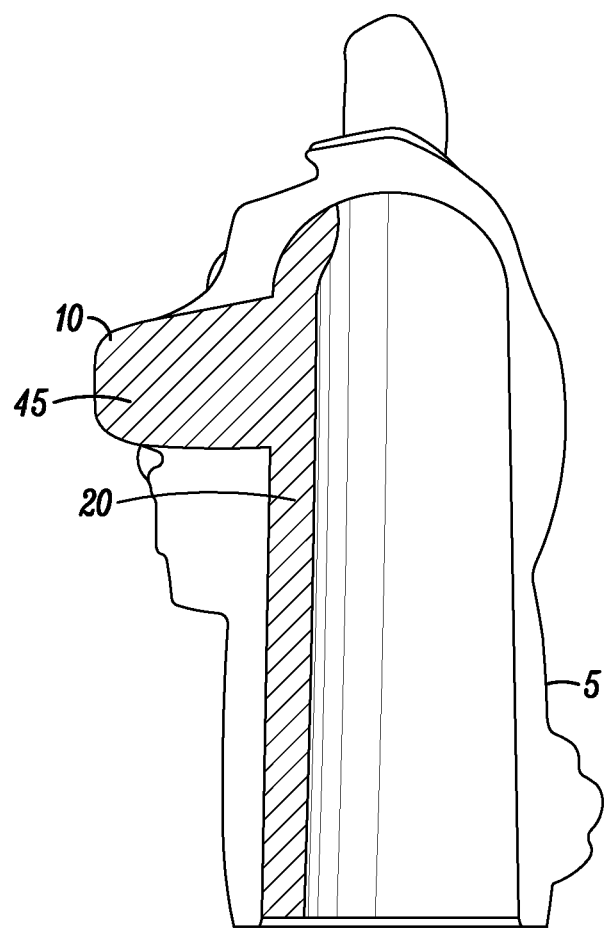
FIG. 9 illustrates a cut-away view along line B-B of FIG. 6 and provides one embodiment of the present invention.

In alternative embodiments, a conductive insert is used in conjunction with the body. Referring to FIGS. 3, 7 and 9, a conductive insert 20 is seen from an internal view of the device 1 as lining at least one interior wall of the device 1 cavity 15. It may be provided to contact the user's finger 30 by at least one or more points and/or may be optionally provided to substantially encapsulate at least a surface of the user's finger.

The conductive insert 20 is electrically connected to the contact point(s) 10. To this end, the contact point 10 and the conductive insert may be provided as separate elements coupled so as to be in electrical communication or as a single piece. In certain non-limiting embodiments, the conductive insert 20 cradles at least a portion of the user's finger, creating an electrically conductive pathway that extends to the tip of the contact point 10. When the extending tip of the contact point 5 is placed in contact with a touchscreen panel, the electrically conductive pathway transfers the electrical pulse of the user's body through the material and to the contact point(s), thus creating a disturbance with the electrostatic field of the touchscreen device and allowing the user to manipulate aspects of the touchscreen display.

In one non-limiting embodiment, the electrically conductive insert material 20 is shaped like an upside-down thimble having one or more extensions 45 into the contact point(s) 10 of the body 5. In such embodiments, the conductive insert's shape contacts, or in certain embodiments hugs, the user's finger 30 once it is inserted into the body 5. The thimble-like shape ensures that there is sufficient contact surface area between the finger and the conductive insert material to create an electrical bridge that can conduct the electrical pulse from the user's finger through the material to the contact point(s) 10. In embodiments where the body 5 is shaped like an animal, figurine, character or the like, the electrically conductive insert material may be shaped like an upside-down thimble with multiple extensions 45 including, but not limited to, the nose, hands and/or ears of the device. This, again, creates an electrically conductive bridge that extends to the nose, hands, and tips of the ears, that, when a finger is inserted, the electrical charge of the user's finger may be transferred to the touchscreen panel at any one of the contact points 10 resulting in a disturbance in the touchscreen panel's electrostatic field that allows the user to have variety in manipulating the device.

In another non-limiting embodiment, (and referring to FIGS. 3, 7, and 9) the electrically conductive insert 20 is pad-shaped and does not completely enclose the user's finger 30, but contacts the finger 30 at one or more positions. In such embodiments, the conductive insert's shape may conform to the contours of the user's finger once it is inserted into the body. The pad-like shape ensures that there is sufficient contact between the finger and the conductive insert material to create an electrical bridge that transfers the electrical charge of the user's finger to one or more of the contact points 10. In embodiments where the body 5 is shaped like an animal, figurine, character or the like, the pad-like conductive insert material may include one or multiple extensions 45 including, but not limited to, the nose, hands and/or ears of the device. This, again, creates an electrically conductive bridge that extends to the nose, hands, and tips of the ears, that, when a finger is inserted, the electrical charge of the user's finger may be transferred to the touchscreen panel at any one of the contact points 10 resulting in a disturbance in the touchscreen panel's electrostatic field that allows the user to have variety in manipulating the device.

In certain non-limiting embodiments, insert 20 or the interior wall of the body (when the insert is not present and/or the body contains the conductive additive) may also have a raised series of bumps (not illustrated) on the inside-facing surface to indicate optimal placement for the user's finger pad so as to indicate optimal positioning on the user's finger to ensure a better user experience and/or optimal conductance.

The conductive insert 20 may be made from the same (or different) material as the body 5 and is, therefore, both soft and comfortable, shielding the user's finger from the hard surface of the touchscreen device. The conductive insert and/or contact points also may be made from any material able to obtain an electric charge from the user and provide the charge to the surface of the touchscreen such that it may be detected. That is, in certain aspects, the conductive insert material may be a material that is electrically conductive and has been designed to be safe for use in a children's toy or is safe for use in conjunction with the other materials/methods provided herein. To achieve this, the base material (or total composition of the insert 20, including conductive and non-conductive materials) may be approved for oral and skin contact and the additive used for conductivity may be concentrated sufficiently to create electrical resistance levels in the range of 10e2 to 10e5 ohms per square centimeter and also approved for oral and skin contact.

In certain embodiments, the conductive insert and/or the contact is manufactured from a non-conductive resin material and a conductive additive. Again, the non-conductive resin material may be any material in accordance with the foregoing. Non-limiting examples of such materials include thermoplastic elastomers (TPE), urethane, polyurethane, silicone, polyethylene, polypropylene, polyethylene terephthalate (PET), polyvinyl chloride (PVC), terephthalate (TP), thermoplastic vulcanizate (TPV), thermoplastic polyurethane (TPU), or the like. In certain preferred embodiments the non-conductive base resin of the insert material comprises a thermoplastic elastomer (TPE).

The additives may include any material capable of transferring or channeling electrical charge from one location to another. Non-limiting examples of such additives may include one or more of copper, gold, silver, aluminum, steel, metal alloy, metal coatings, metal wire, metallic threads, metallic powders, conductive tape, conductive paint, conductive foam, carbon black, carbon fiber, stainless steel fiber, nickel coated carbon, silver coated carbon, graphite powder, and combinations thereof.

The conductive additive may be provided in the insert in any amount to render the body electrically conductive. In certain non-limiting aspects, it is provided in an amount from about 1 wt. % to about 90 wt. %; in further embodiments from about 5 wt. % to about 50 wt. %; and in certain embodiments from about 10 wt. % to about 30 wt. %, based on the total weight of the materials used in the insert. In certain preferred, but non-limiting embodiments, the insert includes one or more of the following combinations: a carbon black powder bound or suspended in a thermoplastic elastomer (TPE) resin, a carbon black powder bound or suspended in a urethane resin, a carbon black powder bound or suspended in a silicone resin, stainless steel fiber bound or suspended in a TPE resin, stainless steel fiber bound or suspended in a urethane resin, stainless steel fiber bound or suspended in a silicone resin, silver and/or nickel coated carbon fibers bound or suspended in a TPE resin, silver and/or nickel coated carbon fibers bound or suspended in a urethane resin, silver and/or nickel coated carbon fibers bound or suspended in a silicone resin, graphite powder bound or suspended in a TPE resin, graphite powder bound or suspended in a urethane resin, graphite powder bound or suspended in a silicone resin, a combination of any of these additives bound or suspended in a TPE, urethane, or silicone resin.

As noted above, in certain embodiments the conductive insert and contact are formed from the same or different materials and are provided as either a single or as separate pieces. In the latter, the conductive insert and contacts are electrically connected by an electrically conductive path or bridge. This path may be formed from the same or different materials as the body and/or insert. In certain aspects, the path includes a non-conductive resin, as provided herein with at least one conductive additive. The additive may include any electrically conductive material capable of transferring an electrical charge from one point to another (i.e., from the insert to the contact point). Non-limiting examples include copper, gold, silver, aluminum, steel, metal alloy, metal coatings, metal wire, metallic threads, metallic powders, conductive tape, conductive paint, conductive foam, carbon black, carbon fiber, stainless steel fiber, nickel coated carbon, silver coated carbon, graphite powder, and combinations thereof. In further embodiments, the electrically conductive path includes only an electrically conductive additive, such as those provided above. In other embodiments, the electrically conductive path may also be comprised of anti-static foam or electrostatic dissipative foam. In certain preferred, but non-limiting embodiments, the electrically conductive path includes one or more of the following combinations: a carbon black powder bound or suspended in a thermoplastic elastomer (TPE) resin, a carbon black powder bound or suspended in a urethane resin, a carbon black powder bound or suspended in a silicone resin, stainless steel fiber bound or suspended in a TPE resin, stainless steel fiber bound or suspended in a urethane resin, stainless steel fiber bound or suspended in a silicone resin, silver and/or nickel coated carbon fibers bound or suspended in a TPE resin, silver and/or nickel coated carbon fibers bound or suspended in a urethane resin, silver and/or nickel coated carbon fibers bound or suspended in a silicone resin, graphite powder bound or suspended in a TPE resin, graphite powder bound or suspended in a urethane resin, graphite powder bound or suspended in a silicone resin, a combination of any of these additives bound or suspended in a TPE, urethane, or silicone resin.

Figure 10A:
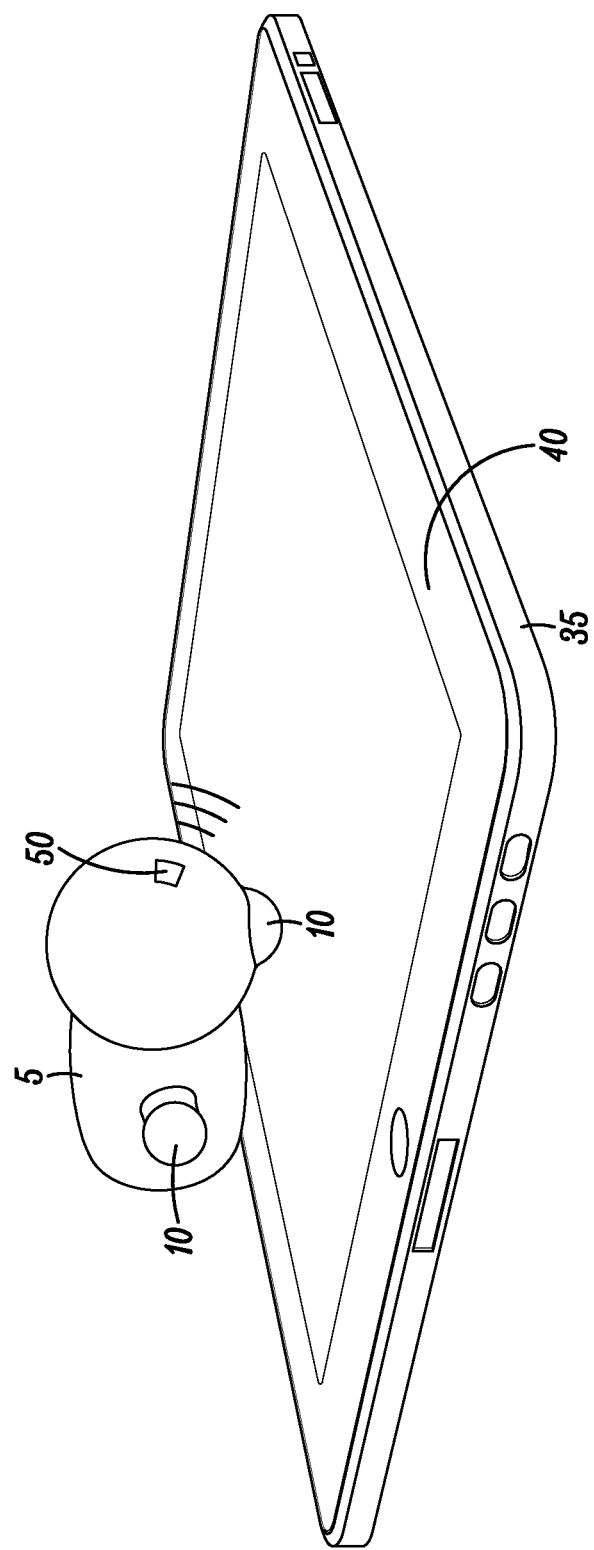
FIGS. 10A-C illustrate a front and side view of one embodiment of the device of the present invention and demonstrate the use of such embodiment on a touchscreen display.
Figure 10B:
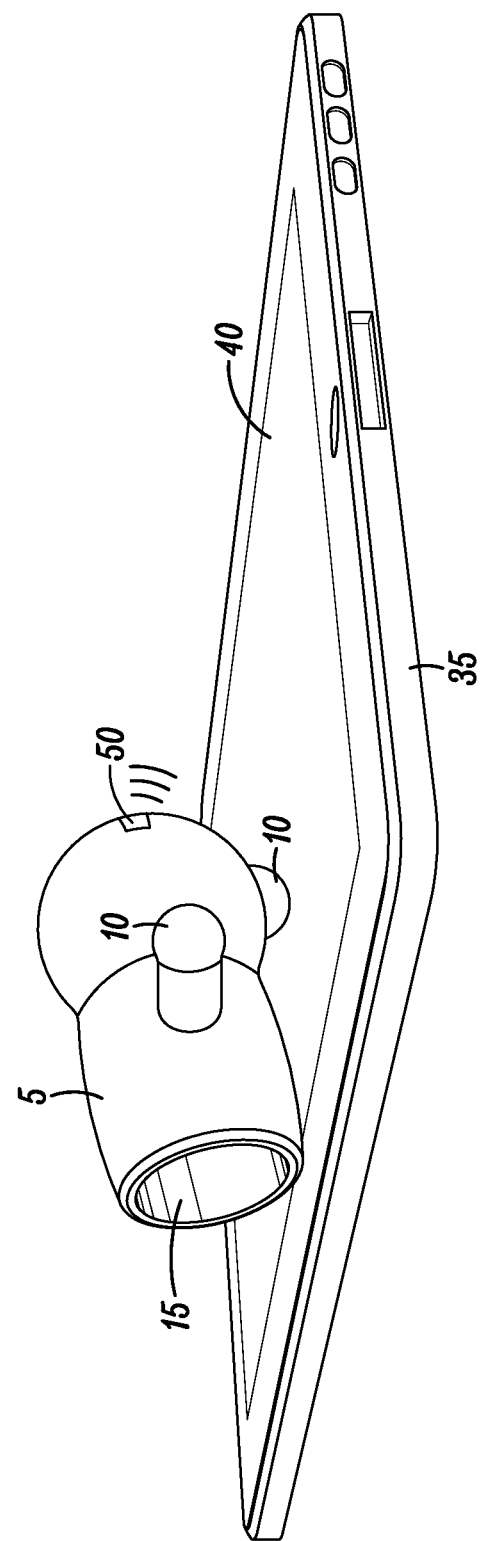
Figure 10C:
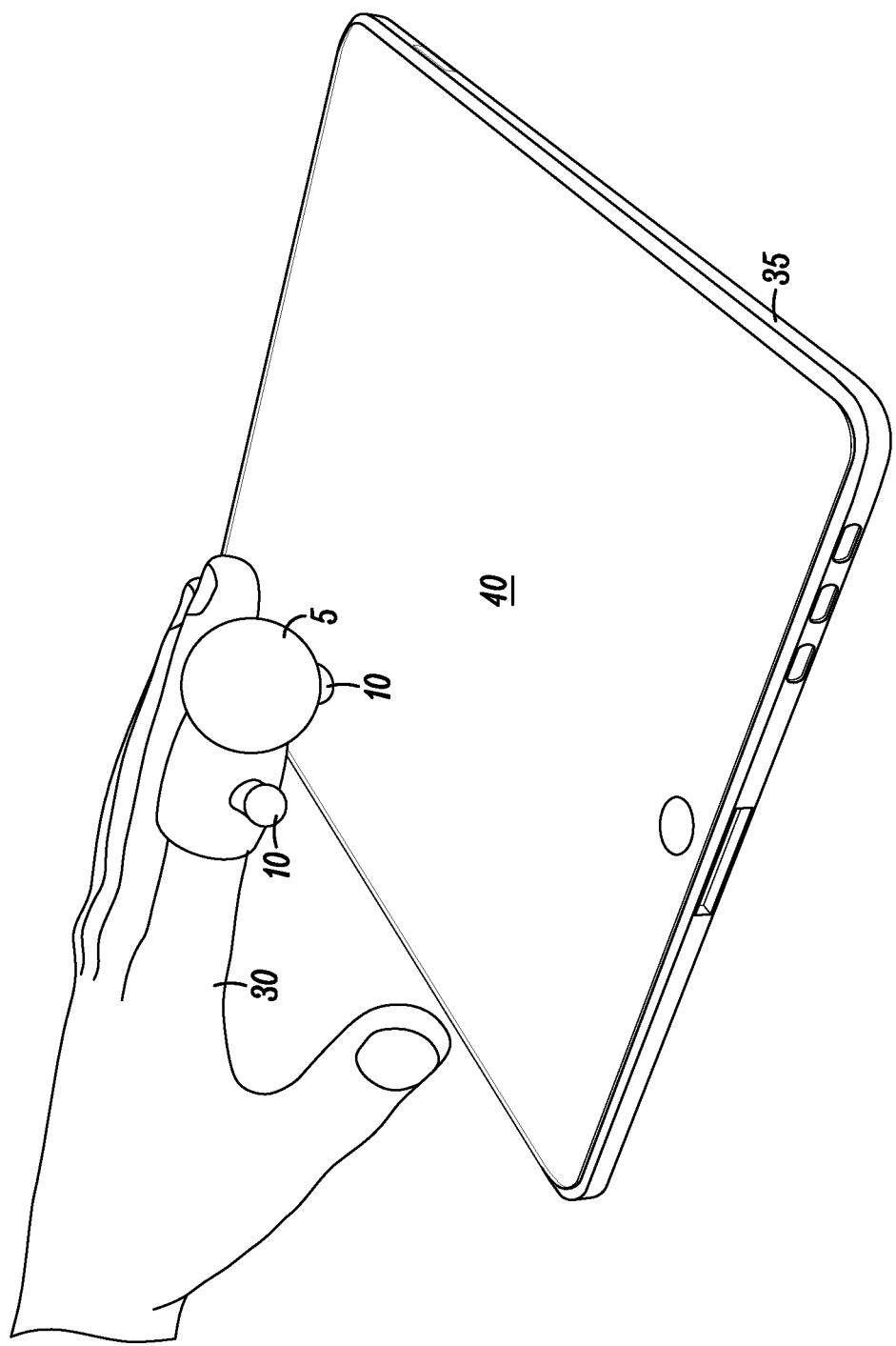

Referring to FIGS. 10A-C, once the user's finger 30 is inserted into cavity 15 and the contact point(s) 10 come into contact with the screen/panel 40 of the touchscreen device 35 the electric pulse transferred onto the screen 40 from the contact 10 is sufficient to disturb the touchscreen panel's 40 electrostatic field allowing for manipulation of the screen's display. More specifically, the conductive additive in the body or conductive insert channels capacitive charge in the finger 30 through the contact point 10 to the touchscreen panel 40 once placed into contact. As illustrated, in one embodiment the device is an animal, character, figurine, humanoid, non-humanoid, shape, design, or the like, wherein the contact point 10 is provided as a portion of the exterior surface of the device. In certain non-limiting aspects, the contact point(s) 10 protrude from the device as part of the design, such as the nose, ears, horn, point of a star, or some other similar extension. In the case of a humanoid, character, animal or the like, the contact points may be an anatomical extension from the device. In other embodiments, when the protruding extension points are a non-animal or non-human, such as a shape or design, the contact point may be any part of the exterior side of the body, particularly, though not exclusively, a part that protrudes sufficiently from the body so as to allow good contact with the touchscreen panel.

The contact point(s) 10 of the device 1 may improve operational efficiency and precise usage of touchscreen devices 35. Many games and applications for touchscreen tablets and phones demand very precise manipulation of the device. The device 1 described herein has at least two benefits that enhance precision: 1) an extended, pointed contact point that's narrower than a finger so users can hit exactly the key they're hoping for and 2) a small enough body so that it does not obstruct the user's view of the touchscreen, which allows users to see exactly what they're selecting on the touchscreen device. Additionally, the contact point(s) of the device may assist the user in precise manipulation of the touchscreen device 35 in cases where such precise manipulation was not previously possible. For example, users who have large finger pads may use the device to more accurately and precisely carry out certain functions such as typing or selecting small details that are difficult to perform with the finger alone.

In an embodiment where there is more than one contact point 10, the ability to use multiple parts of the device 1 to operate a touchscreen device 35 may be used to not only provide variety, but to also improve the user's dexterity. A dexterity building method of use may be applied in educational or rehabilitation contexts, for example. That is, a software application may be developed that has the user touch the screen with, for example, a particular character's nose first, then the ear, then the hand and also may vary which finger is used. Patterns for touching the different contact points to the screen may be developed specifically for this method of use. Functionality of this manner could be both educational in teaching a person, particularly child, the parts of the body, while also developing dexterity, spatial recognition and precise movements.

Such an application also could be tied to various learning games that would be interactive for children, or anyone for that matter, where feedback from the user is required using the device of the present invention. Features of the body 5, for example, may be preprogrammed into the operating system, program, or application of the touchscreen device and may be replicated in virtual games, books, and/or the like, providing a digital avatar that matches the physical apparatus in design and providing an interactive game and/or learning experience for the user. By combining the body with character-focused games, children can stay engrossed in a learning activity, while also improving dexterity.

Again, the device of the present invention may alternatively be used to assist those who have difficulty with the precision use of touchscreen devices, because of the smaller keys, larger hands, or poor motor skills. To this end, the device can be a substitute for using one's finger or may be provided as a learning tool. Alternatively, the device 1 and body 5 can be applied in rehabilitation for individuals who have suffered brain or hand injuries that need to rebuild dexterity, spatial recognition and relearn precise hand and/or finger movements.

The foregoing uses are not intended to be exhaustive or otherwise limited to the invention. To this end, similar or alternative uses consistent with the foregoing can be readily envisioned by one of ordinary skill in the art.

In certain aspects, additional features and elements may be added to one or more of the foregoing embodiments and may be specific to a particular use or function. By way of non-limiting example, in certain embodiments, the device 1 includes one or more communication elements 50 (such as a chip, RFID, bar code, QR reader, or other similar technology) that independently communicates to the touchscreen device 35 certain information about the device 1. Such elements 50 are illustrated in the figures as being provided in the head or top region of the body. The present invention is not limited to such a location and the communication element(s) 50 may be provided on any location of the body, so long as it may be received by the touchscreen device in accordance with the teachings herein. In any such embodiment, an operating system, program, or software application of the touchscreen can be configured to receive or otherwise detect such communication elements 50 and to associate it with one or more features of the body 5 and/or to calculate its location, relative to the touchscreen device.

In certain aspects, for example, the communication element 50 can communicate via an electronic signal (such as through an RFID) certain or specific features or characteristics of the body, such as the type of body, the location of the body, the orientation of the body relative to the screen, or the like. That is, in certain aspects, an operating system, program, or software application of the touchscreen associates a particular frequency (or other similar feature) of an electronic signal with a particular character of body 5, i.e. the character type, size, shape, number of contact points, and the like. It may also sense, based on the distance or strength of the signal (or based on a combination of two or more signals), the orientation of the body 5, distance from the touchscreen device, or the like. By way of non-limiting example, if the device 1 is an animal, shape, humanoid or the like, the communication element 50 would specifically signal this to the touchscreen device 35 using a frequency or other electronic signal that is associated with the body type. This allows the touchscreen device 35 to discriminate among various body types, which could then be used in the context of a software package making use specifically tied to a particular character and/or body design.

In other embodiments, an optics feature of the touchscreen device, such as a camera (not illustrated) or QR reader, visualizes or otherwise scans the body 5 and communication element 50 (which in such embodiments may be a bar code, QR code, or the like). Again, an operating system, program, or software application of the touchscreen device may associate one or more features of the body 5 with the bar code, QR code, or the like. Upon scanning the code, the touchscreen device may recognize the type of body, contact points, and the like, based on preprogrammed features in its software or the program being used. By way of non-limiting example, if the body 5 is an animal, shape, humanoid or the like, the bar code or QR code is located on the body and is scanned by the touchscreen device, which recognizes the code as being associated with a particular character or body 5 type. This could then be used in the context of a software package making use specifically tied to the particular character and/or body design.

In further alternatives or in conjunction with one or more of the above features, the communication element 50 creates a sound that is detectable by a microphone (not illustrated) of the touchscreen device. An operating system, program, or software application of the touchscreen device may be preprogrammed to associate one or more features of the body 5 with the sound, such as the type of body, contact points, and the like. Based on the distance/orientation of the sound, the touchscreen may also establish the location of the body, the orientation of the body relative to the screen, or the like. By way of non-limiting example, if the body 5 is an animal, shape, humanoid or the like, this would be communicated to the touchscreen via a sound emanating from the communication element 50. This could then be used in the context of a software package making use specifically tied to the particular character and/or body design.

In further embodiments, the body may include (or the communication element 50 may be provided as) an accelerometer or a similar aspect that may be used by the touchscreen device to measure the relative motion of the body 5. In such embodiments, an operating system of the touchscreen can be configured to use the body 5 to calculate its location, relative to the touchscreen device. Again, such an aspect could then be used in the context of a software application making use specifically tied to the particular character being used and/or device 1 design.

In certain embodiments, the body 5 may include the contact points 10 (or any other protuberances of the body 5) that are arranged in a unique pattern on the exterior surface of the body 5. When a touchscreen device is contacted by each of the contact points/protuberances in this pattern simultaneously, the pattern is recognized by the touchscreen device as corresponding with a particular character or figure. In certain preferred, but non-limiting aspects, these contact points/protuberances are spaced around the circumference of the bottom of the body 5. When the bottom is placed on the touchscreen (without the user's finger 30 within cavity 15), the device can detect, based on the arrangement of the contact points/protrusions, what character it is based on a preprogrammed software application that associates such patterns with particular body types. The software package can then tailor interaction with the body 5 based on such recognition.

Figure 11:
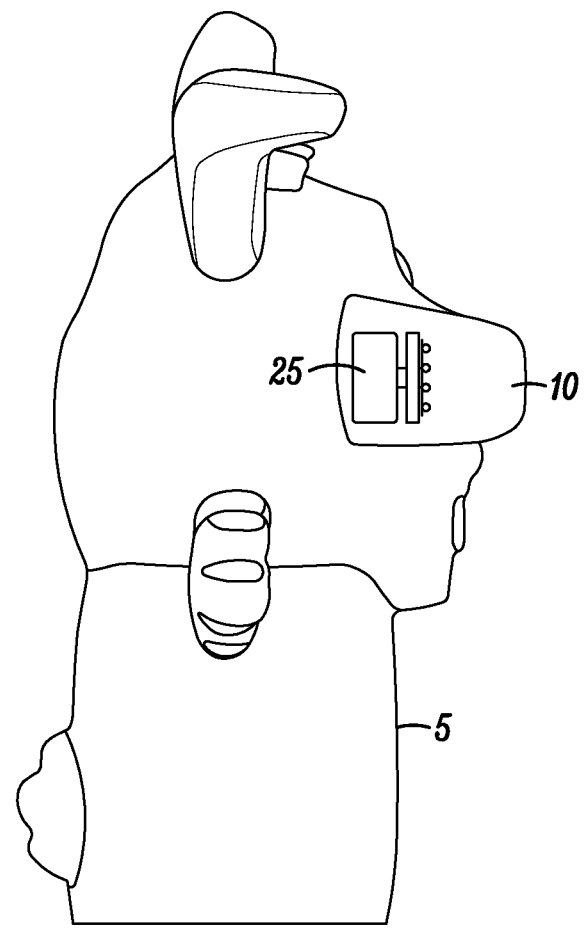
FIG. 11 illustrates a side-view of an alternative embodiment of the present invention having an electricity generating device.

In any of the foregoing embodiments or as an alternative to any of the foregoing embodiments, the present invention is not limited to deriving the electrical signal from the finger of the user. Referring to FIGS. 5 and 11, in one embodiment, the body 5 of the device 1 uses an artificially generating device 25 in place of (or in certain embodiments in conjunction with) the conductive insert 20 or a conductive additive in the body 5. The artificial electricity generating device may be any device able to substantially produce an electrical charge from an artificial source (such as a battery) at or near that of the user's finger. To this end, and in certain preferred embodiments, a separate battery-powered electrical generating device is electrically connected to the contact point (such as through the electrical pathway or bridge described herein) and provides the contact point 10 with an electric charge in accordance with the above. In certain embodiments, a separate electric generating device is electrically connected to each contact point and in further embodiments all contact points are connected to a single electric generating device.

In any of the foregoing embodiments, or in any adaption thereof, the device body 5 may be manufactured using any of the materials and methods known or discussed herein. The electric generating device may be secured to the body of the device at any point using any method or combination of methods discussed herein or otherwise known such that the charge may be provided. To this end, and in certain embodiments, the device can be used with a touchscreen device without actually having to be worn by the user and in accordance with the foregoing.

In any of the embodiments provided herein, the manufacturing method used may be any method consistent with the capabilities and qualities of the materials provided. In one embodiment, for example, the body that makes up the device may be produced through vacuum casting with a non-conductive base material and optionally the electrically conductive additive. The conductive insert material, if used, may be injection molded with the base material and a conductive additive. The conductive insert material is then inserted into and coupled to the external shell and the extending contact point of the conductive material is pushed through a hole in the body that was molded to allow for the conductive material to protrude through.

In another embodiment, the external shell that makes up the body 5 of the device may be produced through vacuum casting with a non-conductive base material and optionally the electrically conductive additive. The conductive insert material, if added, is injection molded with the base material and a conductive additive into a pad-like or thimble-like shape. The conductive insert is then inserted into and coupled to the external shell and the extending contact point of the conductive material is pushed through a hole in the external shell that was molded to allow for the conductive material to protrude through.

In another embodiment, the external shell that makes up the body 5 of the device may be produced through injection molding or microinjection molding with a non-conductive base material and optionally the electrically conductive additive. The conductive insert, if added, may be provided as a thimble or pad-shaped material that is injection molded or microinjection molded with the base material and a conductive additive. The conductive insert thimble or pad-shaped material is then inserted into and coupled to the external shell and the extending contact point of the conductive material is pushed through a hole in the external shell that was molded to allow for the conductive material to protrude through.

In another embodiment, the external shell that makes up the body 5 of the device may be produced through compression molding with a non-conductive base material and optionally the electrically conductive additive. The conductive insert, if added, may be provided as a thimble or pad-shaped material that is also molded with the base material and a conductive additive. The conductive insert thimble or pad-shaped material is then inserted into and coupled to the external shell and the extending contact point of the conductive material is pushed through a hole in the external shell that was molded to allow for the conductive material to protrude through.

In another embodiment, the external shell that makes up the body 5 of the device may be produced through rotational molding with a non-conductive base material and optionally the electrically conductive additive. The conductive insert, if added, may be provided as a thimble-like or pad-shaped material that is injection molded with the base material and a conductive additive. The conductive insert thimble-like or pad-shaped material is then inserted into and coupled to the external shell and the extending contact point of the conductive material is pushed through a hole in the external shell that was molded to allow for the conductive material to protrude through.

In another embodiment, the external shell that makes up the body 5 of the device may be produced through blow molding with a non-conductive base material and optionally the electrically conductive additive. The conductive insert, if included, may be thimble-like or a pad-shaped material that is injection molded with the base material and a conductive additive. The conductive insert thimble-like or pad-shaped material is then inserted into and coupled to the external shell and the extending contact point of the conductive material is pushed through a hole in the external shell that was molded to allow for the conductive material to protrude through.

In another embodiment, the external shell that makes up the body of the device may be produced through any of the following molding techniques including, but not limited to, vacuum casting, injection molding, microinjection molding, rotational molding, blow molding, compression molding, with any non-conductive resin or rubber-like base resin, such as those provided herein. Such techniques, again, may include the non-conductive resin alone or in combination with a conductive additive. In the latter, the contact point could be molded with the body 5.

The conductive insert material, if included, may be molded through any of the following molding techniques including, but not limited to, vacuum casting, injection molding, microinjection molding, rotational molding, blow molding, compression molding, and the like, with a non-conductive base resin and a conductive additive. While not necessarily limiting to the invention, it may be molded into a thimble-like, pad-like or otherwise effective shape that transfers the electrical charge of the user from the finger to the extension tip(s). It can be molded with each of the contact points such that the insert and the contact points are provided as one piece. Alternatively, the insert and contact points can be molded separately and coupled together using any method that forms the electrical bridge or pathway, as discussed herein. The conductive insert and contact points are then inserted into the external shell and the contact point of the conductive material is pushed through a hole in the external shell that was molded to allow for the conductive material to extend through. Combinations or variations of any of these manufacturing processes may be utilized in the manufacture of the conductive insert for the device. The electrically conductive bridge/pathway comprised of any of the aforementioned material(s) may be placed on the external surface of the device or be placed both externally and internally.

In another embodiment, the conductive insert, when provided, and contact points may be molded in accordance with the foregoing. The body of the device is then overmolded on top of the conductive insert material, allowing the contact point to protrude through so as to be able to come into direct contact with a touchscreen panel.

In further non-limiting embodiments, multiple layers of the insert and/or body may be overmolded where each contains a different conductivity. The specific conductivity of each layer may correspond with a different contact point, such that each contact point of the body 5 has a different conductivity level. The software or operating system of the touchscreen also can be configured to associate each conductivity with a particular contact point of the body 5. To this end, it can sense which contact point 10 of the body 5 contacts the touchscreen at any given time. Such an aspect could then be used in the context of a software package making use specifically tied to the particular character and/or body design.

Applicants respectfully submit that the present invention is presented in the context of use with a conductive touchscreen application. One of skill in the art would readily appreciate that the present invention is not necessarily limited to such embodiments and that the present invention may be adapted for use with other types of touchscreen systems, such as, but not limited to, resistive touchscreen devices, surface acoustic wave touchscreens, infrared grid, infrared acrylic projection, optical imaging, acoustic pulse recognition, and the like.

Although the invention has been described with reference to preferred embodiments, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiments disclosed, but that the invention will include all embodiments falling within the scope of the appended claims or any claims later added.

What is claimed is:

1. An apparatus for operating a capacitive touchscreen device comprising:
   a rigid or semi-rigid body having an exterior side and a hollow interior side that is sized to receive and substantially surround at least a portion of a finger of a user; and
   one or more contact points on the exterior side of the body element, wherein each contact point when placed into contact with a touchscreen device provides and/or channels an electrical charge to the touchscreen device, wherein the body is shaped to form an animal, a figurine, a character, or a humanoid, and at least one contact point comprises an appendage of the animal, humanoid, wherein at least one appendage is selected from the group consisting of a nose, an arm, a hand, an ear, a horn, and a paw.

2. The apparatus of claim 1, wherein the body comprises a non-conductive resin and at least one electrically conductive additive such that the contact point is any portion on at least the exterior side of the body and such that when the body receives and contacts the finger of the user electrical charge is transferred and/or channeled from the finger to the contact point(s).

3. The apparatus of claim 2, wherein the non-conductive resin is selected from the group consisting of TPE, urethane, polyurethane, silicone, polyethylene, polypropylene, PET, PVC, TP, TPV, TPU, and combinations thereof and the electrically conductive additive is selected from the group consisting of copper, gold, silver, aluminum, steel, metal alloy, metal coatings, metal wire, metallic threads, metallic powders, conductive tape, conductive paint, conductive foam, carbon black, carbon powder, carbon fiber, stainless steel fiber, nickel coated carbon, silver coated carbon, graphite powder, and combinations thereof.

4. The apparatus of claim 2, wherein the electrically conductive additive is provided in an amount from about 10 wt. % to about 50 wt. %, based on the total weight of the materials used in the body.

5. The apparatus of claim 2, wherein the non-conductive resin comprises TPE and the electrically conductive additive comprises carbon black or carbon powder.

6. The apparatus of claim 1, further comprising at least one insert material in electrical communication with the one or more contact points and coupled to a portion of the interior side of the body element such that when the body receives the finger of the user the finger contacts the insert material an electrical charge is transferred and/or channeled from the finger to the insert material and the contact point(s).

7. The apparatus of claim 6, wherein the body comprises a non-conductive resin and the insert material comprises a non-conductive resin with an electrically conductive additive.

8. The apparatus of claim 7, wherein the non-conductive resin of the body is selected from the group consisting of TPE, urethane, polyurethane, silicone, polyethylene, polypropylene, PET, PVC, TP, TPV, TPU, and combinations thereof.

9. The apparatus of claim 7, wherein the non-conductive resin of the conductive insert is selected from the group consisting of TPE, urethane, polyurethane, silicone, polyethylene, polypropylene, PET, PVC, TP, TPV, TPU, and combinations thereof and the conductive additive is selected from the group consisting of copper, gold, silver, aluminum, steel, metal alloy, metal coatings, metal wire, metallic threads, metallic powders, conductive tape, conductive paint, conductive foam, carbon black, carbon powder, carbon fiber, stainless steel fiber, nickel coated carbon, silver coated carbon, graphite powder, and combinations thereof.

10. The apparatus of claim 7, wherein the conductive additive is provided in an amount from about 10 wt. % to about 50 wt. %, based on the total weight of the materials used in the insert.

11. The apparatus of claim 10, wherein the non-conductive resin body comprises and the conductive insert comprises silicone and carbon black or carbon powder.

12. The apparatus of claim 6, wherein the insert material is in electrical communication with the one or more contact points by an electrically conducting path.

13. The apparatus of claim 12, wherein the electrically conductive path comprises a material selected from the group consisting of copper, gold, silver, aluminum, steel, metal alloy, metal coatings, metal wire, metallic threads, metallic powders, conductive tape, conductive paint, conductive foam, carbon black, carbon powder, carbon fiber, stainless steel fiber, nickel coated carbon, silver coated carbon, graphite powder, and combinations thereof.

14. The apparatus of claim 1, further comprising a communication element coupled to the body that communicates with a touchscreen device to communicate one or more features of the body element that are recognized by the touchscreen device.

15. The apparatus of claim 14, wherein the communication element is selected from the group consisting of and RFID, a barcode, a QR code, a sound emitting device, and combinations thereof.

16. The apparatus of claim 1, wherein the body comprises a non-conductive resin and at least one electrically conductive additive such that the contact point is any portion on the exterior side of the body and the body is coupled to at least one electricity generating device that imparts an electrical charge to one or more of the contact points.

17. The apparatus of claim 1, further comprising at least one insert material in electrical communication with the one or more contact points and coupled to a portion of the interior side of the body element such that when the body receives the finger of the user the finger contacts the insert material and electrical charge is transferred and/or channeled from the finger to the insert material, and the body is also coupled to at least one electric generating device that alone or in conjunction with the insert material imparts an electrical charge to one or more of the contact points.

18. The apparatus of claim 1, wherein the body has a hardness of between about 10 to about 60 shore A.

19. An apparatus for operating a capacitive touchscreen device comprising:
a thermoplastic elastomer-based resin body having an exterior side and a hollow interior side that is sized to receive and substantially surround at least a portion of a finger of a user; and
one or more contact points at one or more locations on the exterior side of the body element, wherein each contact point when placed into contact with a touchscreen device provides and/or channels an electrical charge to the touchscreen device, wherein the body is shaped to form an animal, a figurine, a character, or a humanoid, and at least one contact point comprises an appendage of the animal, figurine, character, or humanoid, wherein at least one appendage is selected from the group consisting of a nose, an arm, a hand, an ear, a horn, and a paw.

20. The apparatus of claim 19, wherein the thermoplastic elastomer-based resin body comprises at least one electrically conductive additive such that the contact points comprise any portion on at least the exterior side of the body and such that when the body receives and contacts the finger of the user an electrical charge is transferred and/or channeled from the finger to the contact point(s).

21. The apparatus of claim 20, wherein the electrically conductive additive is selected from the group consisting of copper, gold, silver, aluminum, steel, metal alloy, metal coatings, metal wire, metallic threads, metallic powders, conductive tape, conductive paint, conductive foam, carbon black, carbon powder, carbon fiber, stainless steel fiber, nickel coated carbon, silver coated carbon, graphite powder, and combinations thereof.

22. The apparatus of claim 20, wherein the electrically conductive additive comprises carbon black or carbon powder and is provided in an amount from about 10 to about 50 wt. %, based on the total weight of the materials used in the body.

23. The apparatus of claim 19, further comprising at least one insert material comprising a non-conductive resin and an electrically conductive additive in electrical communication with the one or more contact points and coupled to a portion of the interior side of the body element such that when the body receives the finger of the user the finger contacts the insert material an electrical charge is transferred and/or channeled from the finger to the insert material.

24. The apparatus of claim 23, wherein the non-conductive resin is selected from the group consisting of TPE, urethane, polyurethane, silicone, polyethylene, polypropylene, PET, PVC, TP, TPV, TPU, and combinations thereof and the conductive additive is selected from the group consisting of copper, gold, silver, aluminum, steel, metal alloy, metal coatings, metal wire, metallic threads, metallic powders, conductive tape, conductive paint, conductive foam, carbon black, carbon powder, stainless steel fiber, nickel coated carbon, silver coated carbon, graphite powder, and combinations thereof.

25. The apparatus of claim 23 wherein the non-conductive resin of the insert material comprises silicone and the conductive additive comprises carbon black or carbon powder in an amount from about 10 wt. % to about 50 wt. %, based on the total weight of the materials used in the insert.

26. The apparatus of claim 19, wherein the body has a hardness of between about 25 to about 40 shore A.

27. A method for manipulating a conductive touchscreen device comprising:
providing an apparatus comprising: a rigid or semi-rigid body having an exterior side and a hollow interior side that is sized to receive and substantially surround at least a portion of a finger of a user; and one or more contact points on the exterior side of the body element, wherein each contact point when placed into contact with a touchscreen device provides and/or channels an electrical charge to the touchscreen device, wherein the body is shaped to form an animal, a figurine, a character, or a humanoid, and at least one contact point comprises an appendage of the animal, figurine character, or humanoid, wherein at least one appendage is selected from the group consisting of a nose, an arm, a hand, an ear, a horn, and a paw;

inserting the finger of user into the hollow interior side of the rigid body; and contacting a surface of a touchscreen device such that the electrical charge of the one or more contact points is received by the touchscreen device.

* * * * *